United States Patent [19]
McFall

[11] Patent Number: 6,082,827
[45] Date of Patent: Jul. 4, 2000

[54] MULTIDIRECTIONAL DUMPING APPARATUS FOR A CONVEYING SYSTEM

[76] Inventor: Robert M. McFall, P.O. Box 1282, Clintwood, Va. 24228

[21] Appl. No.: 09/419,953

[22] Filed: Oct. 18, 1999

[51] Int. Cl.[7] ............................................. B60P 1/04
[52] U.S. Cl. .................... 298/17.6; 298/7; 298/9
[58] Field of Search .................... 298/7, 9, 17.5, 298/17.6, 17.8; 414/469

[56] References Cited

U.S. PATENT DOCUMENTS

| | | |
|---|---|---|
| 573,987 | 12/1896 | Layton ........................................ 298/9 |
| 1,819,411 | 8/1931 | Flowers .................................. 298/22 R |
| 3,269,520 | 8/1966 | Bishop et al. . |
| 3,510,014 | 5/1970 | Speaker et al. . |
| 3,589,501 | 6/1971 | Harrison . |
| 3,662,874 | 5/1972 | Muller . |
| 3,669,245 | 6/1972 | Wooten et al. . |
| 4,089,404 | 5/1978 | Venzke . |
| 4,139,088 | 2/1979 | Olesen . |
| 4,635,785 | 1/1987 | Prydtz . |
| 4,744,454 | 5/1988 | Polling . |
| 5,086,905 | 2/1992 | Polling . |

FOREIGN PATENT DOCUMENTS

| | | | |
|---|---|---|---|
| 24 16 642 | 9/1975 | Germany ............................. | 414/469 |
| 505 513 | 5/1939 | United Kingdom ....................... | 298/9 |

*Primary Examiner*—D. Glenn Dayoan
*Assistant Examiner*—Scott A. Carpenter
*Attorney, Agent, or Firm*—Michael E. McKee

[57] ABSTRACT

A dumping apparatus for a conveying system for transporting a load from one site to another site at which the load is dumped from the apparatus includes a carriage which is supportable by a track for movement therealong and a dump bed which is supported by the carriage for pivotal movement relative thereto about both a vertical axis and a horizontal axis. The apparatus also includes mechanisms interposed between the carriage and the dump bed for pivoting the dump bed about the vertical axis to a desired position thereabout and for pivoting the dump body about a horizontal axis so that the dump bed can be tilted so as to dump the dump bed at any location about the horizontal axis.

14 Claims, 2 Drawing Sheets

MULTIDIRECTIONAL DUMPING APPARATUS FOR A CONVEYING SYSTEM

BACKGROUND OF THE INVENTION

This invention relates generally to conveying systems for conveying an object and/or material from one site to another site, and more particularly, is concerned with such systems which employ a dump body which must be physically tipped over in order to dump the contents thereof.

To enhance the flexibility and speed of a conveying system which employs a dump body which is emptied by a physical tipping of the body over from an upright orientation, it would be desirable to provide a dumping apparatus having a body which is capable of being tipped over in any of a number of directions.

Accordingly, it is an object of the present invention to provide new and improved dumping apparatus for use in a conveying system wherein the body of the dumping apparatus is capable for being tipped over in any of a number of directions.

Another object of the present invention is to provide such a dumping apparatus having a dump body which can be rotated or pivoted through 360° of freedom about a vertical axis and can be tipped over about any horizontal axis which extends through the vertical axis.

Still another object of the present invention is to provide such a dumping apparatus which is uncomplicated in construction yet effective in operation.

SUMMARY OF THE INVENTION

This invention resides in a dumping apparatus for a conveying system for transporting a load from one site to another site at which the load is dumped from the apparatus.

The dumping apparatus includes a carriage which is movable from one site to another site and support means providing a support surface upon which a load to be dumped is positionable and wherein the support means is supported by the carriage for pivotal movement relative thereto about both a vertical axis and a horizontal axis. Means are interposed between the carriage and the support means for pivoting the support means about the vertical axis to a desired position thereabout and for pivoting the support means about a horizontal axis so that the support means can be tilted so as to dump the support means at any location about the horizontal axis.

DETAILED DESCRIPTION OF THE ILLUSTRATED EMBODIMENTS

Figure 1:
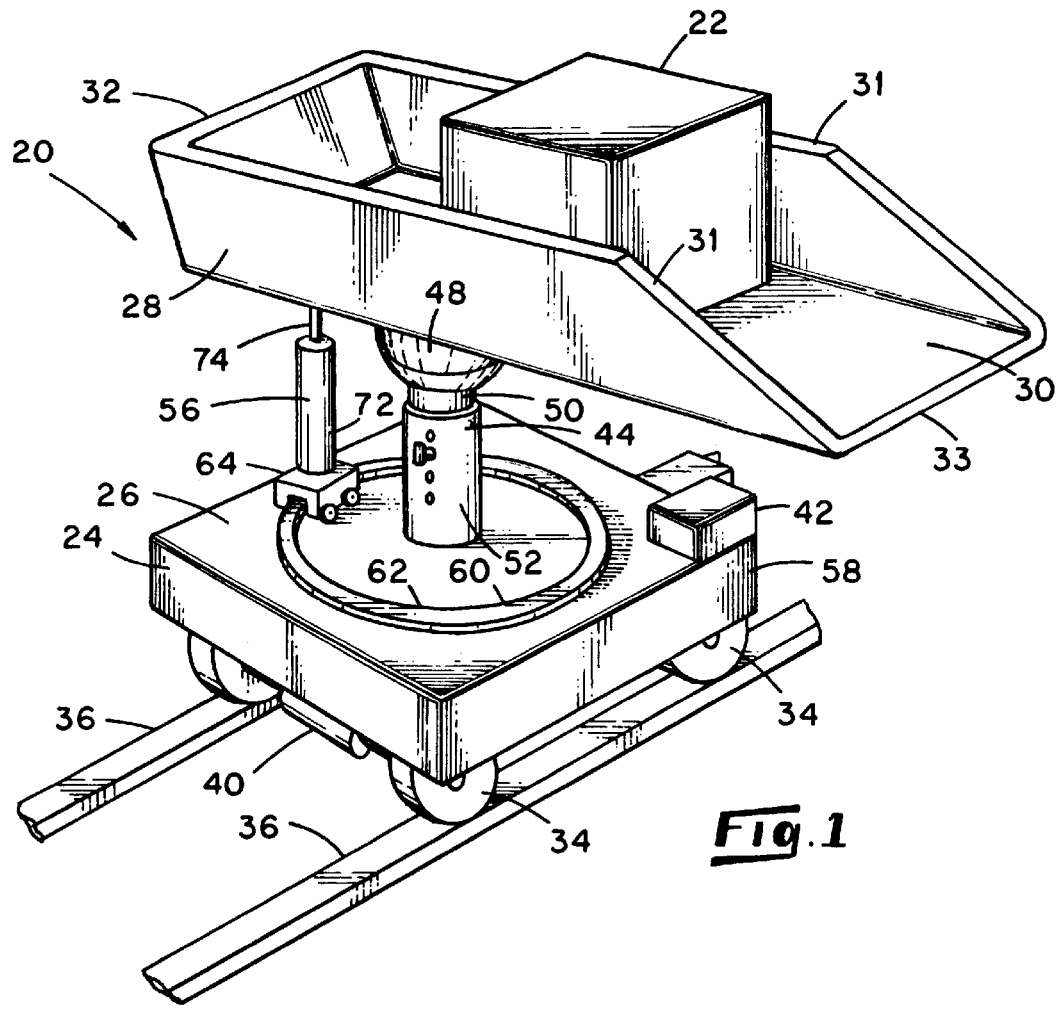
FIG. 1 is a perspective view of a fragment of a conveying system within which an embodiment of a multidirectional dumping apparatus is utilized.

Turning now to the drawings in greater detail, there is shown in FIG. 1 a conveying system, generally indicated 20, for conveying an article 22 from one site to another site. To this end, the conveying system 20 includes a dumping apparatus 24 having a wheeled carriage 26 and support means, in the form of a dump bed 28, which is supported upon the carriage 26 for movement relative thereto in any of a number of directions. The dump bed 28 of the depicted apparatus 24 has a flat upper surface 30 which is bounded on three sides by sideboards 31. While the depicted dump bed 28 is well-suited for supporting an article, such as the box-like article 22, until dumped from the surface 30 from the edge 33 of the surface 30, other dump beds can be designed; for example, in a cupped-shape, a circular shape, flat shape or any shape that could prove efficient for dumping purposes.

The wheeled carriage 26 includes a body 32 and a set of wheels 34 which are journaled to the body 32 for rotation relative thereto and which are mounted upon tracks 36 for rolling movement therealong. The tracks 36 extend between one site at which the article 22 is placed upon the upper surface 30 of the dump bed 28 and another site at which the article 22 is unloaded from the dump bed 28 as the dump bed 28 is tipped from its normally-horizontal orientation so that the article 22 falls from the edge 33 of the surface 30. The wheels 34 of the carriage 26 can be suitably locked to the tracks 36 (or the carriage 26 can be suitably weighted) to prevent the carriage 26 from tipping over under the weight of the article 22 when the dump bed 28 is tipped over, but for conveyance of articles which are relatively light in weight, it is not as necessary to lock the wheels 34 to the tracks 36.

For purposes of moving the carriage 26 along the length of the tracks 36, the apparatus 24 includes a reversible electric motor 40 whose shaft is connected in driving relationship to the wheels 34. The motor 40 receives power from a source, such as a battery, and because of its reversibility, is capable of moving the carriage 26, and thus the dump bed 28, in either of two directions along the length of the tracks 36. Mounted upon the carriage 26 is a control computer 42 which is appropriately wired to the motor 40 for controlling its operation.

Figure 2:
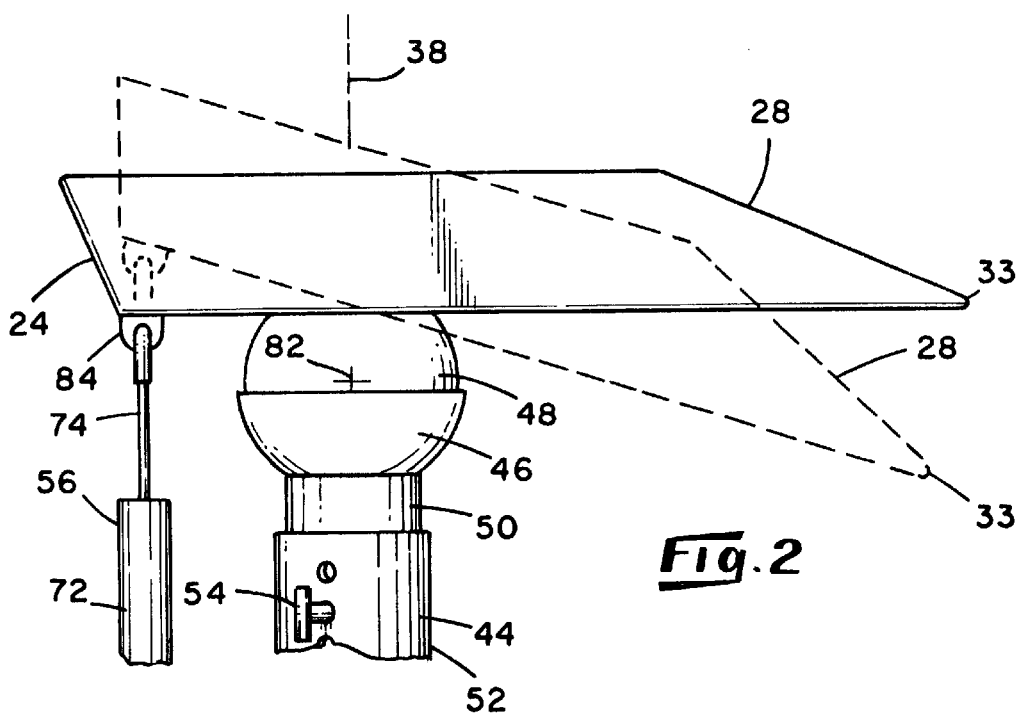
FIG. 2 is a front elevational view of a fragment of the FIG. 1 dumping apparatus.
Figure 3:
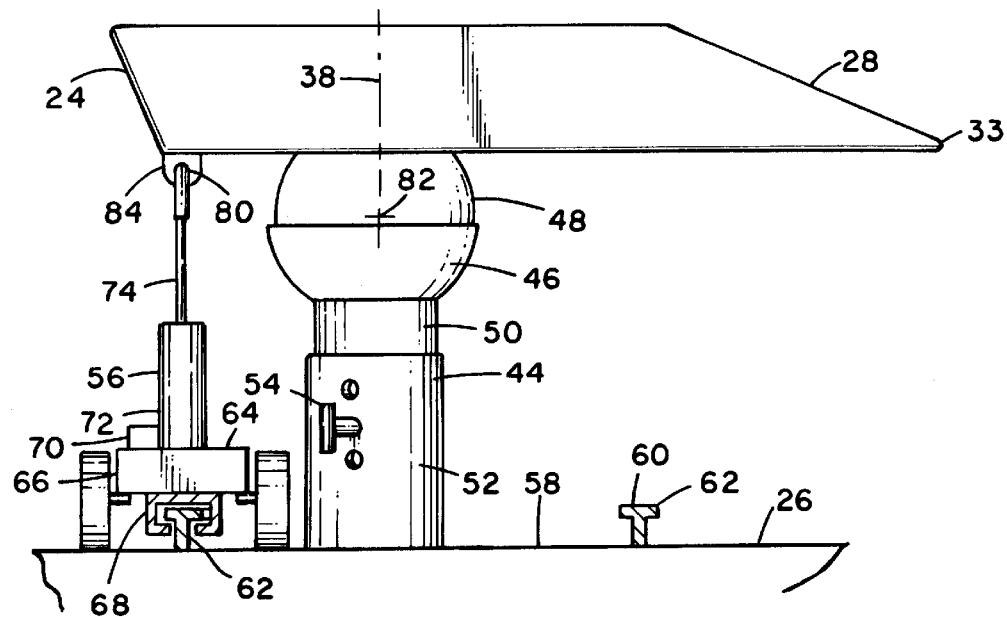
FIG. 3 is a front elevational view of an alternative fragment of the FIG. 1 dumping apparatus.

With reference to FIGS. 2 and 3 and as mentioned earlier, the dump bed 28 is supported by the carriage 26 for movement relative thereto in any of a number of directions. To this end, the carriage 26 includes a telescoping (e.g. upwardly and downwardly-adjustable) support pedestal 44 which is fixed at its lower end to the carriage body 32 so as to be oriented vertically with respect thereto and which includes an upwardly-opening socket 46 at its upper end which cooperates with a ball 48 secured beneath the dump bed 28 so that the bed 28 can be rotated or pivoted relative to the carriage 26 through 360° of freedom about a vertical center axis 38 extending through the support pedestal 44. It follows that the ball 48 is rotatably received by the socket 46 in a ball and socket arrangement.

The support pedestal 44 includes upper and lower sections 50 and 52, respectively, which are connected together in a telescoping fashion to permit the dump bed 28 to be selectively raised and lowered with respect to the carriage body 32. To maintain the dump bed 28 at a selected height relative to the carriage body 32, the sections 50 and 52 are provided with a set of holes which can be aligned with one another (following a shifting of the sections 50, 52 longitudinally of one another), and a pin 54 is inserted through the aligned openings. In the alternative, the telescoping members 50, 52 can be replaced with a jack whose ram is used to raise or lower the dump bed 28 relative to the body 32.

As mentioned above, there is attached to the underside of the dump bed 28 a ball 48 which is received by the upwardly-opening socket 46 of the pedestal 44. The ball 48 is fixedly attached, as by welding, to the underside of the dump bed 28, and the socket 46 has an interior bearing surface which contacts the surface of the ball and is lined with a low-friction material, such as Teflon®, which permits the ball 48 to be rotated or pivoted about its center as its surface moves in sliding engagement with the interior surface of the socket 46. In the alternative, the interior surface of the socket 46 can be lined with ball bearings to reduce the amount of surface-to-surface friction which could otherwise be generated as the surface of the ball 48 moves in sliding contact with the interior surface of the socket 46. In any event, the ball 48 and socket 46 cooperate as a universal joint to permit the angular relationship of the dump bed 28 relative to the carriage 26 to be adjusted.

To pivot the dump bed 28 relative to the carriage 26, the apparatus 24 includes a carriage-mounted jack 56 which is supported by the body, indicated 58, of the carriage 26 for movement relative thereto and which is pivotally connected to the underside of the dump body 28 to effect movement thereof when the ram of the jack 56 is moved upwardly or downwardly. In this connection, there is associated with the carriage body 58 an endless (i.e. circular) guideway 60 including a rail 62 which is attached atop the upper surface of the carriage body 58 so as to encircle the pedestal 44. In addition, there is provided a small wheeled truck 64 upon which the jack 56 is supported and which cooperates with the guideway 60 so that movement of the truck 64 along the upper surface of the carriage body 58 is guided by the guideway 60. To this end, the truck 64 includes a wheeled body 66 having a downwardly-opening channel 68 which straddles and is interlocked with the rail 62 (which has a T-shaped cross section) so that as the truck 64 is moved along the rail 62, the movement of the truck 64 is confined to movement along the rail 62. If desired, the wheeled body 66 can be weighted as a counter balancing measure. Supported by the wheeled body 66 is a reversible electric servomotor 70 whose shaft is connected in driving relationship with the wheels of the truck body 66 so that appropriate actuation of the servomotor 70 moves the truck 64 in one direction or the other direction along the rail 62. It follows that by controlling the actuation and de-actuation of the servomotor 70 will move the truck 64 to any location along the rail 62 and thus any position around the pedestal 44. As is the case with the motor 40 of the carriage 26, the operation of the truck motor 70 is controlled by the control computer 42 which is adapted to send command signals to the motor 70.

With reference still to FIG. 3, the jack 56 includes a base 72 which is rigidly secured to the body 66 of the truck 64 so as to extend vertically upwardly therefrom and a ram 74 which is slidably (and telescopically) received within the base 72 so as to extend upwardly therefrom. By appropriately actuating the jack 56 (which can be either hydraulic or an electrically-powered screw jack), the ram 74 can be raised or lowered with respect to the base 72 of the jack 56.

As mentioned earlier, the upper end of the ram 74 of the jack 56 is pivotally connected to the underside of the dump bed 28 so that actuation of the jack 56 effects a tilting, or pivoting, or the dump bed 28 relative to the carriage 26. To this end, a boss 84 is fixedly secured to the underside of the dump bed 28 and openings are provided in each of the boss 84 and the upper end of the ram 74. By positioning the openings of the boss 84 and the upper end of the ram 74 in aligned relationship and then inserting a pivot pin 80 through the aligned openings, the ram 74 and dump bed 28 are pivotally secured to one another. With the ram 74 and dump bed 28 secured to one another in this manner, any upward or downward movement of the ram 74 effects a pivoting of the dump bed 28, by way of the ball 48, about a pivot axis 82 which extends through the center of the ball 48.

It follows that since the jack 56 is pivotally connected to the underside of the dump bed 28 (by way of the pivot pin 80), a raising or lowering of the ram 74 of the jack 56 rotates the ball 48 about a horizontal axis extending through the center of the ball 48 and which intersects the vertical axis 38 about which the ball 48 is permitted to pivot within the socket 46. If, for example, the dump bed 28 is positioned in a horizontal orientation and the ram 74 of the jack 56 is lowered from a raised position, the bed 28 tilts (or pivots) rearwardly toward the side of the bed 28 corresponding with the jack 56. By comparison, if the dump bed 28 is positioned in a horizontal orientation and the ram 74 of the jack 56 is raised from a lowered position, the bed 28 tilts (or pivots) forwardly toward the side of the bed 28 opposite the jack 56 to, for example, the position illustrated in phantom in FIG. 2. Consequently, by moving the wheeled truck 64 to a desired position about the pedestal 44, such as the position diametrically opposite the direction toward which the bed 28 is desired to be tilted, and then the jack 56 is raised to elevate the ram 74, the bed 28 tilts in the desired direction. Of course, if an article 22 (FIG. 1) is positioned upon the dump bed 28 when the bed 28 is tilted, the article falls off of the dump bed 28 by way of the edge 33.

To utilize the dumping apparatus 24, the dump bed 28 is oriented in a horizontal orientation (as depicted in solid lines in FIG. 1) and the carriage 26 is moved, by means of the motor 40 to a site at which the article 22 (or some other comparable load) is placed upon the dump bed 28. With the article 22 positioned upon the dump bed 28, the carriage 26 is moved toward and parked adjacent a site at which the article 22 is desired to be dumped. By appropriately positioning the wheeled truck 64 in a desired relationship relative to the pedestal 44 (along the rail 62) so that the jack 56 is positioned on the side of the pedestal 44 opposite the direction toward which the bed 28 is desired to be tilted and then actuating the jack 56 so that the ram 74 is raised to an elevated position, the dump bed 28 is tilted to a condition at which the article 22 is dumped from the bed 28. Operation of the dumping apparatus 24, i.e. the sequencing of the motors 40, 70 and positioning of the various components such as the carriage 26, truck 64 and ram 74 of the jack 56, is controlled by the control computer 42.

Figure 4:
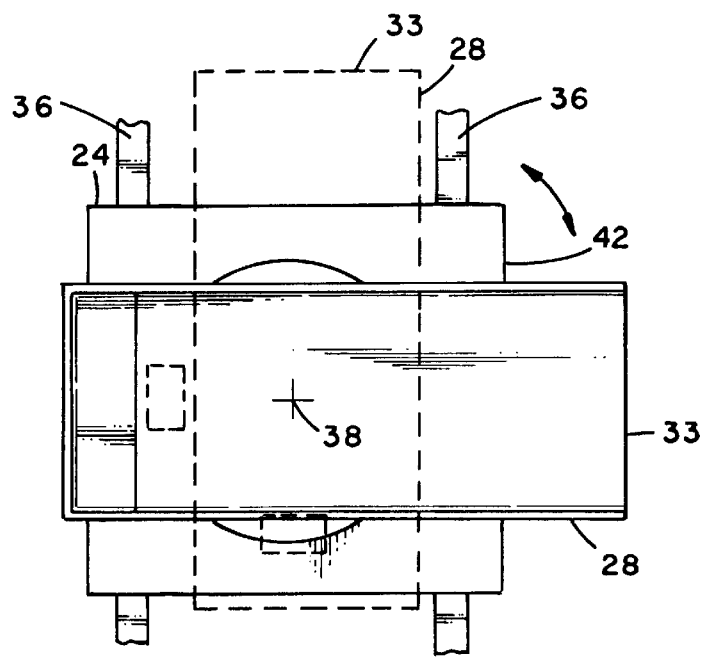
FIG. 4 is a top plan view of the FIG. 1 dumping apparatus.

It follows from the foregoing that a dump apparatus 24 has been described which includes a dump bed 28 which can be tilted (in a dumping action) in any of a number of directions relative to its supporting carriage 26. In particular, the bed 28 can be rotated about the vertical axis 38 to orient the edge 33 of the upper surface 30 of the bed 28 on the side of the carriage 26 toward which the load of the bed 28 is desired to be tilted, thereby permitting the edge 33 to be directed in any direction normal to the vertical center axis 38 of the ball 48. For example, there is illustrated in solid lines in FIG. 4 the orientation of the dump bed edge 33 when the dump bed 28 is directed to one side of the carriage 26 and there is illustrated in phantom the orientation of the dump bed edge 33 when the dump bed 28 is directed rearwardly of the carriage 26. Moreover, by appropriately actuating the jack 56 when the edge 33 is directed in the desired direction of tilt, the bed 28 is tilted so as to dump the load carried by the bed 28. Thus, the bed 28 can be tilted (so as to dump its load) when disposed in any orientation about the vertical axis 38, and the dumping apparatus 24 is advantageous in this respect.

It will be understood that numerous modifications can be made to the aforedescribed embodiments without departing from the spirit of the invention. For example, although the aforedescribed multidirectional dumping apparatus 24 has been described as including a carriage 26 whose movement is guided along a pair of tracks 36, a dumping apparatus in accordance with the broader aspects of the present invention need not require tracks or similar guideway-providing means For example, a carriage upon which a dump bed is pivotally supported can include wheels which are adapted to roll along a floor or similar surface while an internal (e.g. computer-controlled) steerage system is utilized for controlling the direction of movement, and thus the guidance, of the carriage. Accordingly, the aforedescribed embodiment is intended for the purpose of illustration and not as limitation.

What is claimed is:

1. A dumping apparatus for a conveying system for transporting a load from one site to another site at which the load is dumped from the apparatus, the dumping apparatus comprising:

a carriage which is movable from one site to another site;

support means providing a support surface upon which a load to be dumped is positionable and wherein the support means is supported by the carriage for pivotal movement relative thereto about both a vertical axis and a horizontal axis; and means interposed between the carriage and the support means for pivoting the support means relative to the carriage about the vertical axis to a desired position thereabout and for pivoting the support means relative to the carriage about a horizontal axis so that the support means can be tilted so as to dump the support means at any location about the horizontal axis; and wherein the interposed means includes a rotary which is interposed between the support means and the carriage which permits the support means to be pivoted relative to the carriage about a horizontal and vertical axes.

2. The apparatus as defined in claim 1 wherein the support means has a forward edge across which a load is desired to be dumped and the interposed means for pivoting is adapted to rotate the support means about the vertical axis to a position at which the forward edge is disposed on the side of the carriage toward which the support means is desired to be tilted.

3. The apparatus as defined in claim 1 wherein the carriage includes an upwardly and downwardly-extending support pedestal, and the rotary which is interposed between the support means and the support pedestal includes a ball and socket arrangement which permits the support means to be pivoted relative to the carriage about a horizontal axis.

4. The apparatus as defined in claim 3 wherein the socket is an upwardly-opening socket which is connected to the support pedestal at the upper end thereof, and the ball is rotatably received within the opening of the socket and is fixedly secured to the support means to prevent movement of the support means relative to the ball.

5. The apparatus as defined in claim 4 wherein the interposed means for rotating is connected to the ball so that by rotating the ball relative to the pedestal, the forward edge of the support means can be rotated through 360° of freedom about the vertical axis.

6. The apparatus as defined in claim 1 wherein the carriage is adapted to be movably supported by a track for movement from one site to another site at which the load is dumped from the apparatus.

7. The apparatus as defined in claim 1 wherein the support means is a dump bed.

8. A dumping apparatus for a conveying system for transporting a load from one site to another site at which the load is dumped from the apparatus, the dumping apparatus comprising:

a carriage which is movable from one site to another site;

support means providing a support surface upon which a load is positionable for transport from one site to another site where the load is dumped from the support means and wherein the support means is supported by the carriage for pivotal movement relative thereto about a vertical axis so that the support surface can be oriented at any position about the vertical axis and about a horizontal axis to permit the support surface to be dumped from a substantially horizontal orientation to a tilted orientation at which a load is dumped from the support means; and means interposed between the carriage and the support means for pivoting the support means relative to the carriage about the vertical axis to a desired position thereabout and for pivoting the support means relative to the carriage about the horizontal axis so that the support means can be tilted so as to dump the load from the support surface at the desired position about the horizontal axis; and wherein the interposed means includes a rotary which is interposed between the support means and the carriage means which permits the support means to be pivoted relative to the carriage about a horizontal and vertical axes.

9. The apparatus as defined in claim 8 wherein the support surface has a forward edge across which a load is desired to be dumped and the interposed means for pivoting is adapted to rotate the support surface about the vertical axis to a position at which the forward edge is disposed on the side of the carriage toward which the support means is desired to be pivoted.

10. The apparatus as defined in claim 8 wherein the carriage includes an upwardly and downwardly-extending support pedestal, and the rotary which is interposed between the support means and the support pedestal includes a ball and socket arrangement which permits the support means to be pivoted relative to the carriage about a horizontal axis.

11. The apparatus as defined in claim 10 wherein the socket is an upwardly-opening socket which is connected to the pedestal at the upper end thereof, and the ball is rotatably received within the opening of the socket and is fixedly secured to the support means to prevent movement of the support means relative to the ball.

12. The apparatus as defined in claim 11 wherein the interposed means for rotating is connected to the ball so that by rotating the ball relative to the pedestal, the forward edge of the support surface can be rotated through 360° of freedom about the vertical axis.

13. The apparatus as defined in claim 8 wherein the carriage is adapted to be movably supported by a track for movement from one site to another site at which the load is dumped from the apparatus.

14. The apparatus as defined in claim 8 wherein the support means is a dump bed.

* * * * *